United States Patent [19]
Nagati

[11] 3,963,222
[45] June 15, 1976

[54] GAS COLLECTING HOOD FOR METALLURGICAL VESSEL

[75] Inventor: Rashed N. Nagati, New Castle, Pa.

[73] Assignee: Pennsylvania Engineering Corporation, Pittsburgh, Pa.

[22] Filed: Feb. 28, 1975

[21] Appl. No.: 554,312

[52] U.S. Cl. ............................................. 266/158
[51] Int. Cl.² ........................................... C21C 5/40
[58] Field of Search .... 98/115 R, 115 MV, 115 FV; 122/7 R, 7 A; 266/15–17, 13, 35, 36 P, 36 H; 110/119; 165/5, 119, 139; 55/414, 440, 462

[56] References Cited
UNITED STATES PATENTS

| | | | |
|---|---|---|---|
| 132,877 | 11/1872 | Thornton et al. | 110/119 X |
| 2,415,471 | 2/1947 | Dorfan | 98/115 R |
| 2,768,814 | 10/1956 | Frey et al. | 165/139 |
| 3,254,475 | 6/1966 | Farr et al. | 55/440 X |
| 3,592,630 | 7/1971 | Willett | 55/440 X |
| 3,788,619 | 1/1974 | Dortenzo | 266/13 |
| 3,799,520 | 3/1974 | Hegemann et al. | 266/16 X |
| 3,842,904 | 10/1974 | Gardenier | 122/7 R |

FOREIGN PATENTS OR APPLICATIONS

| | | | |
|---|---|---|---|
| 145,390 | 3/1931 | Switzerland | 266/15 |
| 746,931 | 3/1956 | United Kingdom | 122/7 R |
| 770,219 | 3/1957 | United Kingdom | 98/115 R |
| 814,783 | 6/1959 | United Kingdom | 122/7 A |
| 897,724 | 5/1962 | United Kingdom | 122/7 A |

Primary Examiner—Gerald A. Dost
Attorney, Agent, or Firm—Fred Wiviott

[57] ABSTRACT

A water cooled, off-gas collecting hood is adapted to be disposed above the open end of a metallurgical vessel into which oxygen and a hydrocarbon shielding fluid are blown through submerged tuyeres. The hood includes an elbow section at its upper end for being coupled to an obliquely downwardly extending conduit communicating with the inlet of a gas cleaning system. A water cooled flow divider is disposed across the elbow and between the upper end of the vessel and the top of the elbow for dividing into upper and lower flow paths the gases discharging from the vessel and which are redirected in the elbow laterally to the conduit.

12 Claims, 5 Drawing Figures

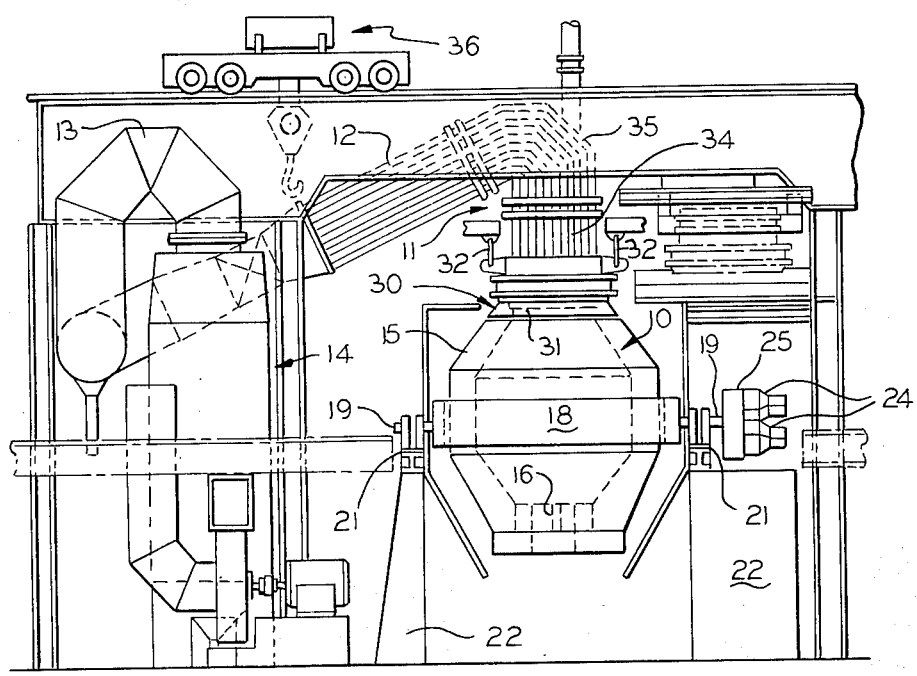
FIG.1
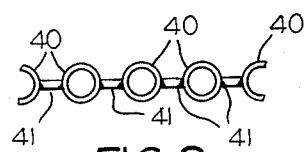
FIG.2
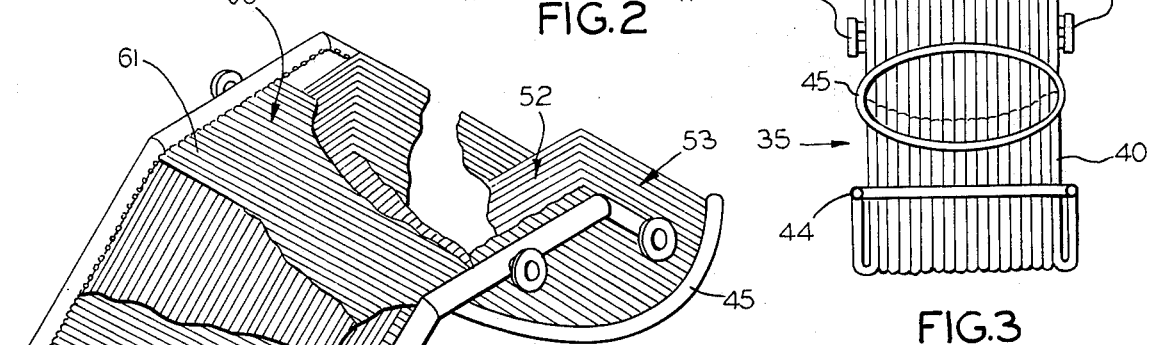
FIG.3
FIG.5
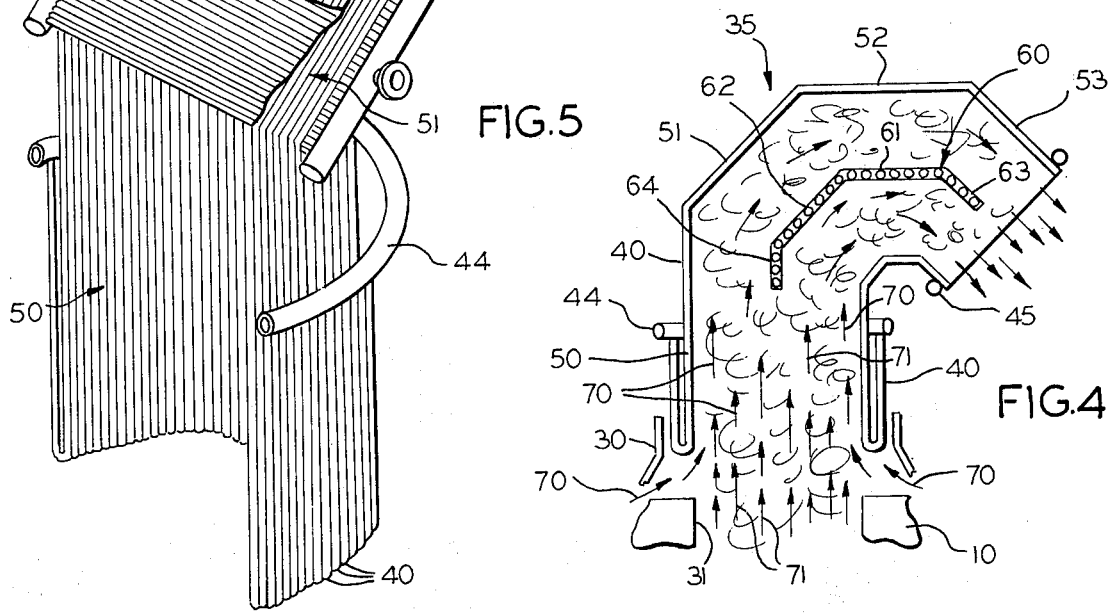
FIG.4

3,963,222

GAS COLLECTING HOOD FOR METALLURGICAL VESSEL

BACKGROUND OF THE INVENTION

Open hearth furnaces have become obsolescent because of relative inefficiencies and their tendency to discharge objectionable fumes and particulate matter. One suitable replacement for open hearth furnaces is bottom blown converter vessels wherein oxygen and a hydrocarbon shielding fluid are injected through tuyeres located beneath the level of molten metal. Such vessels are normally provided with a water cooled gas collecting hood having a movable skirt for collecting off-gases exiting the open upper end of the vessel. The hood is normally connected to a gas cleaning system by means of water cooled conduits. When such equipment is employed as a replacement for existing open hearth furnaces, the arrangement of the gas collecting and cleaning apparatus is dictated by the geometrical configuration of the existing open hearth shop and other preexisting in-place equipment. Such shops generally include overhead cranes and roof height limitations which require that the gas collecting hood include a flow reversing elbow at its upper end for redirecting the hot gases exiting the vessel generally obliquely downward toward an inlet of the gas cleaning system. As a result, that portion of the elbow directly above the mouth of the vessel was subjected to an intense heat load. Further, this portion of the gas collecting hood was exposed to solid particulate matter discharging upwardly from the vessel at relatively high velocities and tending to cause substantial abrasion. Further, this portion of the gas collecting hood was also subject to damage as a result of molten metal spitting from the vessel and shooting upwardly therefrom.

SUMMARY OF THE INVENTION

An object of the invention is to provide a new and improved metallurgical vessel gas collecting hood wherein the heat load on the water cooled flow directing elbow is substantially reduced.

Another object of the invention is to provide a gas collecting hood for bottom blown metallurgical vessels wherein the effective heat transfer surface is substantially increased without increasing the overall dimensions of the hood.

A further object of the invention is to protect the surface of a gas collecting hood from damage resulting from the discharge of metal or particulate material from the vessel.

Still another object of the invention is to provide a gas collecting hood for metallurgical vessels which increases gas flow velocities and reduces the pressure drop thereacross.

Another object of the invention is to provide a gas collecting hood wherein more uniform heat transfer is promoted.

These and other objects and advantages of the present invention will become more apparent from the detailed description thereof taken with the accompanying drawings.

BRIEF DESCRIPTION OF THE DRAWINGS

FIG. 1 diagrammatically illustrates a bottom blown metallurgical vessel and a gas collecting and cleaning system which incorporates a gas collecting hood in accordance with the present invention;

FIG. 2 is a fragmentary sectional view of the cooling tubes which form the gas collecting hood illustrated in FIG. 1;

FIG. 3 is a front elevational view of the gas collecting hood elbow portion;

FIG. 4 is a sectional view of the hood illustrated in FIG. 3; and

FIG. 5 is a perspective view of the gas cleaning hood according to the present invention with parts broken away.

DESCRIPTION OF A PREFERRED EMBODIMENT

FIG. 1 generally illustrates a bottom blown converter vessel 10 of a well known type and which may be coupled by means of a water cooled hood 11 and water cooled conduits 12 and 13 to a gas cleaning system designated generally by the reference numeral 14.

The vessel 10 includes a refractory lining 14 covered by a metallic shell 15. One or more tuyeres 16 extend through the lower end of vessel 10 for injecting oxygen into the molten metal disposed therein. The tuyeres 16 may, for example, include an inner tuyere pipe (not shown) through which the oxygen is injected and a second tuyere pipe (not shown) which surrounds the first pipe and through which a hydrocarbon shielding fluid, such as propane, may be injected into the vessel 10 in surrounding relation to the oxygen for the purpose of prolonging tuyere life as is well known in the art.

The vessel 10 may be supported for pivotal movement by a trunnion ring 18 affixed to the vessel in a conventional manner and having trunnion pins 19 extending from its opposite sides for being received by bearings 21 which are in turn mounted on supports 22. In addition, one or more drive motors 24 may be coupled to one of the trunnion pins 19 through a suitable gear train 25 for pivoting the vessel 10 about a generally horizontal axis for the purpose of charging metal, deslagging and decanting. The details of the vessel 10, the tuyeres 16 and the drive assembly 24, 25 form no part of the present invention and accordingly will not be discussed in detail. For more complete descriptions of such apparatus, reference is made to U.S. Pat. Nos. 3,841,617; 3,771,777; and 3,810,297.

The hood 11 includes a movable skirt portion 30 which may be raised and lowered relative to the open upper end 31 of vessel 10 by any suitable means such as screw jack assemblies 32. The movable skirt 30 is telescopingly received around the open lower end of a vertical conduit portion 34 which is connected at its upper end to an elbow 35, the opposite end of which is coupled to the conduit 12. If the vessel 10 is located in an existing open hearth shop, overhead structures, such as the crane 36, limit the vertical extent of the hood 11 and the height of the gas cleaning system 14. As a result, the elbow 35 must redirect laterally the gases discharging from vessel 10 and the conduit 12 is preferably oriented generally obliquely downwardly.

Those skilled in the art will appreciate that skirt 30 may be raised away from the vessel 10 to permit the latter to be pivoted for charging, decanting or deslagging. When the vessel 10 is in its upright position, illustrated in FIG. 1, the position of skirt 30 relative to the open mouth 31 of the vessel will be determined in accordance with blowing conditions as discussed more fully in co-pending application Ser. No. 340,302, filed Mar. 12, 1973 and assigned to the assignee of the present invention. The fumes collected by the hood 11 are conducted by the elbow 35 and conduits 12 and 13 to the gas cleaning system 14 for being cooled and cleaned in a conventional manner as discussed in said co-pending application.

The hood 11, the conduits 12 and 13 and the elbow 35 may be formed in any suitable manner which will permit water cooling. For example, these members may be formed of a plurality of tubes 40 as shown in FIG. 2 and which are suitably joined by interconnecting web portions 41. The opposite ends of the tubes 40 may be connected to inlet and outlet headers for receiving cooling water therethrough. For example, as shown in FIGS. 3 and 4, the tubes 40 which form the elbow 35 extend from an annular inlet header 44 which surrounds elbow 35 and terminate in an annular outlet header 45 which surrounds the discharge end of elbow 35. Suitable cooling fluid connections (not shown) are coupled to each of the headers 44 and 45 for delivering and withdrawing cooling fluid.

The tubes 40 of elbow 35 are formed so as to define a first generally vertical section 50, a second section 51 inclined upwardly at an oblique angle from the upper end of section 50, a third section 52 extending generally horizontally from the upper end of section 51 and a fourth section 53 extending downwardly at an oblique angle from section 52. The lower end of section 50 is telescopingly received within the movable skirt 30 and forms the inlet of elbow 35 and the lower end of section 53 is coupled to the conduit 12 and forms the outlet of elbow 35. While the cross sectional configuration of the sections of the elbow 35 are shown to be generally circular, it will be appreciated that they may have any convenient shape.

Extending across the elbow 35 is a flow divider 60 formed of individual water tubes 61 which may be spaced apart and joined by webs in the same manner as the tubes 40 illustrated in FIG. 2. The flow divider 60 includes a generally horizontal portion 61 which lies along the axis of the elbow section 52 and portions 62 and 63 which extend downwardly from the opposite ends of portion 61 and contain the axes of elbow sections 51 and 53. Also, a small tail section 64 may be provided at the lower end of portion 62 and may extend generally vertically along the axis of elbow section 40. The tubes 61 which form the flow divider 60 extend laterally across the elbow 35 and through the opposite sides where their ends are coupled to cooling water inlet and outlet headers 65 and 66.

It will be appreciated that the lowermost one of the tubes 61 in section 64 are directly exposed to the hottest portion of the gas stream and hence are most vulnerable to damage. However, because the tubes 61 each terminate in headers 65 and 66, the cooling water to each tube can be terminated individually so that failure of any tube does not require a shut down for repairs.

It will be appreciated that the flow divider 61 generally divides the elbow 35 into an upper flow path lying between the divider 60 and the upper portions of the elbow 35 and a second flow path lying between the divider 60 and the lower portions of the elbow.

As those skilled in the art will appreciate, during a main oxygen blow of the vessel 10, hot gases, such as $CO_2$, CO, $H_2$, $H_2O$ and $N_2$ discharge from the upper end of vessel 10 at temperatures which may be in the range of 3000°F. The gas cleaning system includes a blower fan (not shown) which produces a negative pressure within the gas cleaning system so that a sheath of relatively cooler air is drawn into the elbow 35 through a gap that normally exists between the skirt 30 and the upper end of vessel 10. This cold air is indicated by full line arrows 70 in FIG. 4 and which surround a central core of hot gases discharging from the open upper end 31 of vessel 10 as indicated by the dashed arrows 71. The latter hot gases may also entrain particles and molten metal may also be discharged from the vessel and follow the upward path of the gases 71. In prior art apparatus, these hot gases discharge at high velocity directly upwardly where they are impinged on the lower surface of the elbow section 52. In addition, because of the surrounding cold air sheath 70, there was little transfer of heat from the hot gases 71 to those portions of the tubes 40 which define sections 50 and 51 of the elbow. Consequently, these inordinately hot gases and their entrained particles tended to cause severe erosion and damage to the lower surface of section 52.

The flow divider 60, lying between the upper end 31 of vessel 10 and the upper portion of elbow section 52, divides the hot gas flow so that only a portion flows around the upper end of divider 61 and engages the surface of section 52. As a result, the heat flux in this area of the elbow 35 is substantially diminished. Also, the flow divider 61 substantially diminishes the magnitude of erosion resulting from the impaction of entrained particles since substantially half of the particles are intercepted by said flow divider. Furthermore, because the flow divider 61 is water cooled, it will substantially increase the heat exchange area of the elbow 35 from that obtained in prior art hood configurations of the same general dimensions.

Another advantage of the flow divider 62 is that it promotes turbulence in the hot gas flow path in the areas above and below the flow divider 61 so that the gases 71 forming the relatively hot stream will mix with the cooler air 70 thereby promoting more uniform heat transfer in all portions of the tubes 40 which form elbow 35. Also, the flow divider 60 causes an increase in the velocity of gases flowing in the lower portion of the elbow sections 51 and 52 and 53. This increased velocity enhances heat transfer in addition to keeping the wall of the elbow cleaner thereby further enhancing heat transfer. The flow divider 60 further reduces pressure losses in the elbow 35 as a result of the relationship wherein the pressure drop is related to the ratio of the radius of the bend over its diameter. The flow divider 60 effectively increases the radius of the bend to decrease the pressure drop.

While only a single embodiment of the invention is shown and described, it is not intended to be limited thereto but only by the scope of the dependent claims.

I claim:

1. A hood for receiving gases from the open end of a metallurgical vessel in which oxygen is delivered to a metal charge wherein substantial quantities of hot gases are evolved, said hood including a hollow elbow portion having an inlet adapted to be positioned above the open end of said vessel for receiving upwardly directed gases and an outlet, said elbow portion also including a laterally extending upper surface area lying in the path of said upwardly directed gases for intercepting said gases and for redirecting the same generally laterally to said outlet, and flow divider means disposed in said elbow and positioned in the path of said upwardly directed gases, said flow divider means including a portion arranged in general parallelism with the flow direction defined by said surface area and generally across a portion of the path of said upwardly directed gases and between the inlet of said hood and said area for dividing said elbow into upper and lower flow passages beneath said surface area to divert a substantial portion of said gases to said outlet without direct contact with said surface area.

2. The invention set forth in claim 1 wherein said hood and flow divider means are formed from a plurality of hollow tubular elements, and header means coupled to each of said tubular elements for delivering cooling fluid thereto.

3. The invention set forth in claim 2 wherein the tubular elements forming said flow divider means extend laterally across said elbow portion and out the sides thereof, a first flow header coupled to the corresponding ends of each of said tubular elements at one side of said elbow portion and a second header connected to each of the corresponding ends of said tubes at the other side of said elbow portion.

4. The invention set forth in claim 1 wherein said elbow portion includes a generally vertically disposed section adapted to be disposed above the open upper end of a metallurgical vessel wherein hot gases and particulate matter exiting said vessel enter the lower end of said vertical section at relatively high velocity and pass upwardly for lateral redirection by said surface area, said flow divider having a leading edge which substantially bisects said vertically disposed section, a second portion extending upwardly and in general conformity to said elbow portion and a third portion generally parallel to the flow direction of said gases beneath said surface area for defining said upper and lower flow paths.

5. The invention set forth in claim 1 wherein said elbow portion having a generally horizontally extending section which includes said surface area, said flow divider extends generally horizontally and laterally across the generally horizontal section of said elbow and beneath said surface area.

6. The invention set forth in claim 1 wherein said hood and flow divider means are formed from a plurality of hollow tubular elements, the tubular elements forming said flow divider means extending laterally across said elbow portion and out the sides thereof, a first header means coupled to the corresponding ends of each of said flow divider tubular elements at one side of said elbow portion and a second header means connected to each of the corresponding ends of said tubular elements at the other side of said elbow portion, and additional header means coupled to each of said tubular elements of said elbow portion for delivering cooling fluid thereto, said elbow portion including a generally vertically disposed section adapted to be disposed above the open upper end of a metallurgical vessel wherein hot gases and particulate matter exiting said vessel enter the lower end of said vertically disposed section at relatively high velocity and pass upwardly for lateral redirection by said surface, said flow divider means having a leading edge which substantially bisects said vertically extending section, a second portion extending upwardly and in general conformity to said elbow and a third portion generally parallel to the flow direction of said gases beneath said surface area for defining said upper and lower flow paths.

7. The invention set forth in claim 6 wherein said elbow portion having a generally horizontally extending section which includes said surface area, the third portion of said flow divider extends generally horizontally and laterally across the generally horizontal section of said elbow and beneath said surface area.

8. In combination with a pivotally mounted metallurgical vessel having tuyeres located in its lower end for blowing oxygen beneath the level of molten metal therein and an open upper end through which hot off-gases discharge, a hollow gas collecting hood having an opening disposed above the upper end of said vessel and a first generally vertical section disposed above said opening, said hood including an elbow section disposed above said generally vertical section and having an inlet opening connected thereto, said elbow section having an outlet opening directed obliquely outwardly away from said vessel and a laterally extending surface in the flow path of said off-gases for directing upwardly flowing gases from said inlet laterally to said outlet, flow divider means disposed in said elbow section for dividing the same into upper and lower flow paths, said flow divider being disposed between inlet openings and said outlet and having a portion disposed below said surface and generally parallel thereto to divert a substantial portion of the upwardly flowing gases to said outlet opening and away from said surface, a gas cleaning system displaced generally laterally of said vessel, and conduit means extending generally obliquely from the outlet opening of said elbow and having a remote end coupled to said gas cleaning system for delivering hot gases from said vessel thereto.

9. The invention set forth in claim 8 wherein said hood and flow divider means are formed from a plurality of hollow tubular elements, and header means coupled to each of said tubular elements for delivering cooling fluid thereto.

10. The invention set forth in claim 9 wherein the tubular elements forming said flow divider means extend laterally across said elbow section and out the sides thereof, a first flow header coupled to the corresponding ends of each of said tubes at one side of said elbow section and a second header connected to each of the corresponding ends of said tubes at the other side of said elbow section.

11. The invention set forth in claim 10 wherein said elbow section includes a generally vertically disposed section adapted to be disposed above the open upper end of said metallurgical vessel wherein hot gases and particulate matter exiting said vessel enter the lower end of said vertically disposed section at relatively high velocity and pass upwardly for lateral redirection by said surface, said flow divider means having a leading edge which substantially bisects said vertically extending section a second portion extending upwardly and in general conformity to said elbow section and a third portion generally parallel to the flow direction of said gases beneath said surface for defining said upper and lower flow paths.

12. The invention set forth in claim 11 wherein said elbow section having a generally horizontally extending section which includes said surface, the third portion of said flow divider means extends generally horizontally and laterally across the generally horizontal section of said elbow section and beneath said surface.

* * * * *

UNITED STATES PATENT OFFICE
CERTIFICATE OF CORRECTION

Patent No. 3,963,222          Dated June 15, 1976

Inventor(s) Rashed N. Nagati

It is certified that error appears in the above-identified patent and that said Letters Patent are hereby corrected as shown below:

Claim 6, Column 5, line 59, after "surface" insert --area--.

Claim 7, Column 6, line 4, after "elbow" insert --portion--.

Claim 8, Column 6, line 23, after "between" insert --said--; line 24, cancel "openings"; same line, cancel "said"; same line, after "outlet" insert --openings--.

Claim 10, Column 6, line 43, cancel "tubes" and substitute --tubular elements--; line 45, cancel "tubes" and substitute --tubular elements--.

Signed and Sealed this

Fifth Day of October 1976

[SEAL]

Attest:

RUTH C. MASON
*Attesting Officer*

C. MARSHALL DANN
*Commissioner of Patents and Trademarks*